United States Patent
Bao et al.

(10) Patent No.: US 6,314,008 B1
(45) Date of Patent: Nov. 6, 2001

(54) ADJUSTABLE LOW SPURIOUS SIGNAL DC-DC CONVERTER

(76) Inventors: Jianwen Bao, 1829-D Schoenersville Rd., Bethlehem, PA (US) 18018; John van Saders, 153 Bloomsbury Rd., Asbury, NJ (US) 08802; Norman Scheinberg, 24 New St., South River, NJ (US) 08882

(*) Notice: Subject to any disclaimer, the term of this patent is extended or adjusted under 35 U.S.C. 154(b) by 0 days.

(21) Appl. No.: 09/688,548

(22) Filed: Oct. 16, 2000

(51) Int. Cl.[7] .................................................. H02M 1/14
(52) U.S. Cl. ........................................ 363/44; 363/126
(58) Field of Search ................................ 363/44, 45, 125, 363/126

(56) References Cited

U.S. PATENT DOCUMENTS

| | | | |
|---|---|---|---|
| 2,915,648 | * 12/1959 | Chudleigh et al. | 363/44 |
| 3,036,259 | * 5/1962 | Heilpern | 363/45 |
| 3,735,238 | * 5/1973 | Miller | 363/45 |
| 3,764,886 | * 10/1973 | Zarowin | 363/45 |
| 3,978,388 | * 8/1976 | de Vries | 363/45 |
| 4,131,939 | * 12/1978 | Day | 363/126 |
| 4,371,919 | 2/1983 | Andrews et al. | 363/65 |
| 4,401,952 | 8/1983 | Basawapatna | 330/277 |
| 4,903,186 | * 2/1990 | Pullen | 363/45 |
| 4,954,864 | 9/1990 | Maserjian | 357/30 |
| 5,089,949 | * 2/1992 | Gentile | 363/126 |
| 5,113,336 | * 5/1992 | Takahashi et al. | 363/126 |
| 5,177,453 | 1/1993 | Russell et al. | 330/284 |
| 5,532,576 | 7/1996 | MacRobbie et al. | 323/274 |
| 5,563,545 | 10/1996 | Scheinberg | 327/389 |
| 5,638,265 | 6/1997 | Gabor | 363/89 |
| 5,684,682 | 11/1997 | Zhong et al. | 363/59 |
| 5,748,457 | 5/1998 | Poon et al. | 363/16 |
| 5,757,236 | 5/1998 | Ortiz et al. | 330/296 |
| 5,818,703 | 10/1998 | Jacobson | 363/21 |
| 5,886,595 | 3/1999 | Von Stein | 333/218 |
| 5,912,552 | 6/1999 | Tateishi | 323/285 |
| 5,933,342 | 8/1999 | Callanan | 363/126 |
| 5,936,857 | 8/1999 | Jacobs et al. | 363/100 |
| 5,939,871 | 8/1999 | Tanaka | 323/285 |
| 5,986,900 | * 11/1999 | Clark | 363/44 |

OTHER PUBLICATIONS

Sedra et al., "Microelectronic Circuits," Second Edition, pp. 229–230 (Dec. 1987).

Horowitz et al., "The Art of Electronics," Cambridge University Press, Dec. 1980, pp. 38–40.

* cited by examiner

Primary Examiner—Jeffrey Sterrett

(57) ABSTRACT

The present invention uses an AC signal and an external DC control voltage to generate a plurality of levels of output DC voltages. The level of the output voltage is determined by the DC control voltage and has the opposite polarity. The invention is preferably implemented as a balanced circuit, which generates spurious signals at even harmonics of the AC frequency signal. The spurious signals can then be filtered out using a low-pass filter.

31 Claims, 3 Drawing Sheets

US 6,314,008 B1

ADJUSTABLE LOW SPURIOUS SIGNAL DC-DC CONVERTER

FIELD OF THE INVENTION

The present invention relates generally to microwave dc-dc converter circuits, and in particular, to an adjustable low-spurious signal dc-dc converter that can be fabricated as a monolithic integrated circuit.

BACKGROUND

Front-end amplifiers used in equipment such as cable television sets and other broadband RF receivers require power supplied from a source that has very low distortion, i.e., a very low incidence of spurious signals. Additionally, in many applications such as cellular/PCS telephones, it is desirable that a single power supply be used.

In amplifiers using depletion-mode devices such as Field Effect Transistors (FETs), there is a need for a bias voltage to turn the devices OFF (non-conducting) from a normally ON (conducting) state. Such depletion-mode devices are commonly used in high-frequency devices constructed from materials in Groups III–V (e.g., GaAs). Common examples of high-frequency semiconductor devices built using these and other semiconductor materials are MESFETs, BJTs, and others.

If a depletion-mode device requires a negative bias supply, but the main circuit power supply is positive, then the negative bias potential must in some manner be generated from the positive potential. Conventional systems use a charge pump or an oscillator-rectifier supply to provide such a negative bias potential. But these conventional devices are generally bulky or difficult to integrate in a monolithic integrated circuit chip. Moreover, rectification generally produces spurious signals in such conventional devices.

SUMMARY

In one aspect, a preferred embodiment of the present invention uses an AC signal and a DC control voltage to generate a plurality of levels of output DC voltages. The level of the voltage output is determined by the DC control voltage and has the opposite polarity of the DC control voltage. The present invention thus effectively converts the DC control voltage to an output voltage, i.e., it functions as a dc-to-dc converter.

In another aspect of the present invention, the dc-dc converter is preferably implemented as a balanced voltage source, which will only have spurious signals at even harmonics of the AC frequency signal. In a further aspect, the present invention comprises a circuit that does not load the output, thereby keeping the output voltage ripple to a minimum.

BRIEF DESCRIPTION OF THE DRAWINGS

These and other objects, features and advantages of the present invention will be more readily apparent from the following detailed description of the preferred embodiments, where like numerals designate like parts, in which.

DETAILED DESCRIPTION OF THE PREFERRED EMBODIMENTS

Figure 1:
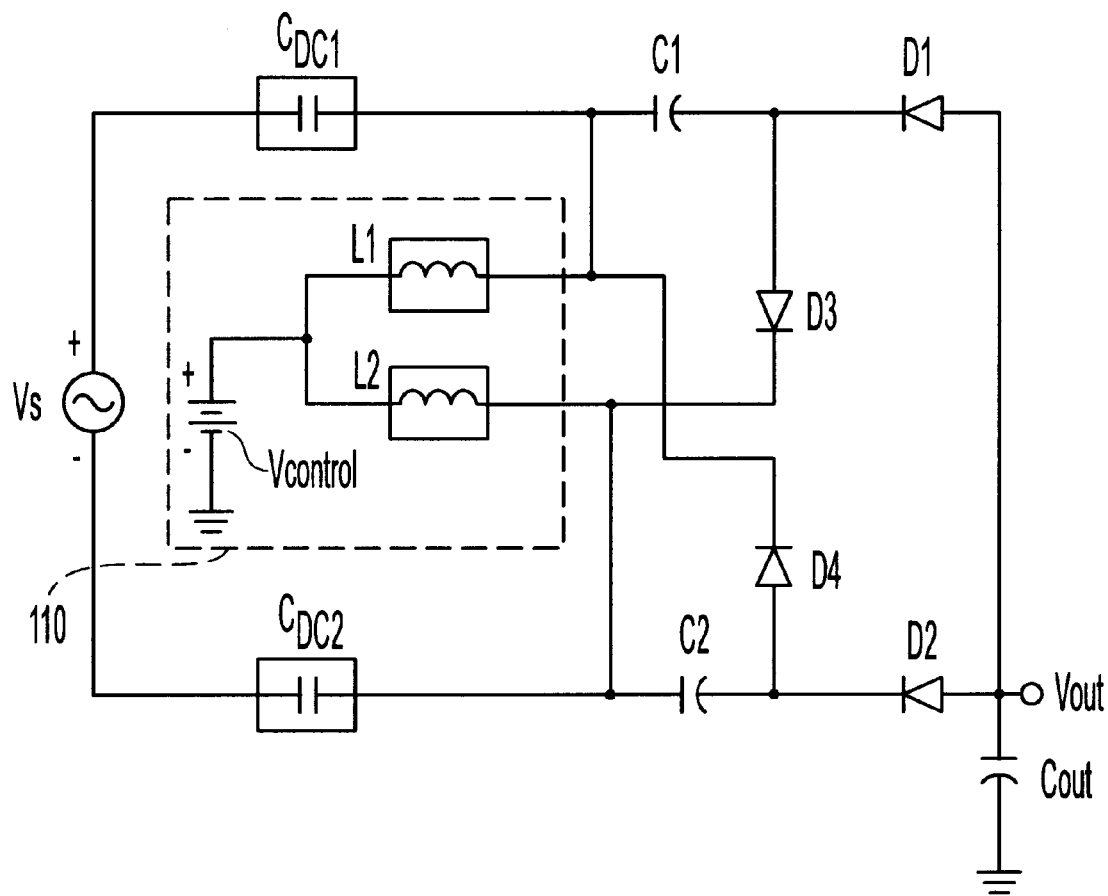
FIG. 1 is a schematic of a preferred embodiment of a dc-dc converter circuit of the present invention.

FIG. 1 shows a first preferred embodiment of a dc-dc converter circuit, which comprises two capacitors $C_1$, and $C_2$, each having a first terminal and a second terminal; and a plurality of very small diodes D1, D2, D3 and D4, each having an anode and a cathode. An output voltage tapping point $V_{OUT}$ is located at an output capacitor $C_{OUT}$, which is connected to a ground at one end.

The capacitors $C_1$, $C_2$ and diodes D1, D2, D3 and D4 are connected in the following way. The cathode of diode D1 and the anode of diode D3 are coupled to the second terminal of the capacitor $C_1$. The cathode of the diode D3 is coupled to the first terminal of the capacitor $C_2$. The anode of the diode D1 is coupled to the output tapping point $V_{OUT}$. The cathode of diode D2 and the anode of diode D4 are coupled to the second terminal of the capacitor $C_2$. The cathode of the diode D4 is coupled to the first terminal of the capacitor $C_1$. The anode of the diode D2 is coupled to the output tapping point $V_{OUT}$.

The capacitors $C_1$ and $C_2$ are coupled to a voltage source $V_S$, which comprises a first terminal and a second terminal. The voltage source $V_S$ is configured to provide a voltage of +1V at the first terminal and −1V at the second terminal during one half of a duty cycle, and a voltage of −1V at the first terminal and +1V at the second terminal during a second half of a duty cycle (i.e., the voltage between the first and second voltage source terminals varies between +2V during the first half cycle and −2V during the second half cycle). In a preferred embodiment, the first terminal of the voltage source $V_S$ is coupled to the first terminal of the capacitor $C_1$. The second terminal of the voltage source $V_S$ is coupled to the first terminal of the capacitor $C_2$. The control circuit 110 includes a voltage source $V_{CONTROL}$ and a pair of inductors $L_1$ and $L_2$ to block any alternating voltage from affecting $V_{CONTROL}$.

Advantageously, the voltage source $V_S$ is a high frequency source, operating at 1–2 gigahertz. In a preferred embodiment, the voltage source $V_S$ is a voltage-controlled oscillator or a local oscillator with a mixer circuit (not shown). The capacitors $C_1$, and $C_2$ are small, preferably about 1 pF each. The diodes D1, D2, D3 and D4 are chosen to be of very small dimensions, preferably about 5 $\mu m^2$ in area. The small size of the diodes ensures that the capacitors $C_1$, and $C_2$ are not shunted. $C_{OUT}$ is also preferably about 1.0 pF. The AC blocking inductors $L_1$, and $L_2$ are chosen to be large, preferably about 10–20 nH. The impedance should preferably be larger than the AC source impedance. The control voltage $V_{CONTROL}$ is a DC feed voltage source preferably between about 0 to +3V.

OPERATION

Referring still to FIG. 1, at each of its terminals, the voltage source $V_S$ provides a signal between +1V and −1V. Any DC component in this signal is blocked by the DC blocking capacitors $C_{DC1}$ and $C_{DC2}$. For the purposes of the present description, it will be assumed for clarity of explanation and without loss of generality that diodes D1, D2, D3 and D4 act as ideal rectifiers and therefore have no voltage drop across them when conducting.

During a first half of a first duty cycle, a voltage of +1V is applied at the first terminal of $V_S$ and the capacitor $C_1$, charges to +1V at its first terminal. At the same time, a voltage of −1V is applied to the first terminal of the capacitor $C_2$, which voltage appears at the second terminal of the capacitor $C_1$, due to the forward-biased diode D3. Diode D4 is reverse-biased, and therefore acts as an open circuit. Thus, a total potential difference of 2V is formed across the first and the second terminals of the capacitor $C_1$.

During a second half of the first duty cycle, a voltage of +IV is applied at the first terminal of $V_S$, and a voltage of +1V is applied at the second terminal of the voltage source $V_S$. D3 is now reverse-biased, and therefore does not conduct any current. But because the voltage $V_S$ of –1V appears at the first terminal of the capacitor $C_1$, and since the voltage across a capacitor cannot change instantaneously, this produces a voltage of –3V (over the course of a few duty cycles) at the output tapping point $V_{OUT}$, since the diode D1 is forward-biased.

Additionally, during the second half of the first duty cycle, a voltage of +1V is applied at the second terminal of the voltage source $V_S$, which appears at the first terminal of the capacitor $C_2$. Similarly, a voltage of –1V appears at the second terminal of the capacitor $C_2$, since the diode D4 is forward-biased during this half-cycle. Thus, a potential difference of +2V appears at the capacitor $C_2$ during this half-cycle, in a manner similar to that across the capacitor $C_1$ during the first half of the duty cycle. Thus, it is easily seen that the operation of capacitors $C_1$, and $C_2$, are 180° out of phase with each other.

During the first half of a second duty cycle, a voltage of +1V is applied at the first terminal of the voltage source $V_S$, which reverse-biases the diode D4. During this halfcycle, a voltage of –1V is applied at the second terminal of the voltage source $V_S$, which causes a potential shift across $C_2$, causing a voltage of –1V and –3V to appear (over the course of a few duty cycles) at the first and the second terminals of the capacitor $C_2$, in a manner explained with reference to the capacitor $C_1$, above. Because the source voltage $V_S$ oscillates at a very high frequency such as 1–2Ghz, before the capacitors $C_1$, or $C_2$ will have discharged, a next cycle starts, thereby ensuring a stable voltage at the output tapping point $V_{OUT}$.

Figure 2:
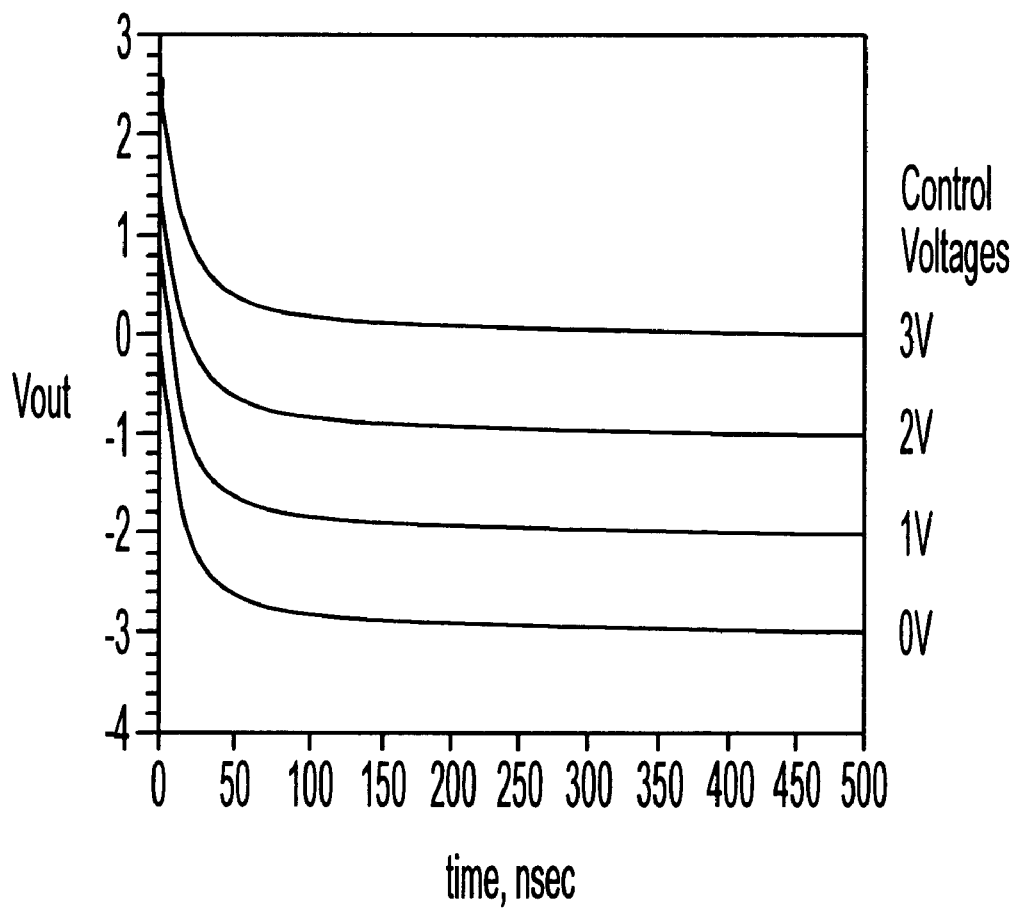
FIG. 2 depicts simulated output voltages produced by a circuit configured according to the principles of the present invention at different control voltages.

A DC feed signal is applied by the control voltage source $V_{CONTROL}$, which is applied in such a way as to cancel the output voltage by discharging the capacitors via the diodes D3 and D4. Thus, when $V_{CONTROL}$ is +1V, the reverse bias across the diodes D3 and D4 is reduced by +1V, causing a potential at $V_{OUT}$ to become –2V. Similarly, when $V_{CONTROL}$ is adjusted to be +2V, the potential at $V_{OUT}$ becomes –1V, and when $V_{CONTROL}$ is increased to +3V, $V_{OUT}$ becomes 0V. Any further increase in $V_{CONTROL}$ is ineffective, since it reverse-biases the diodes D3 and D4. By thus adjusting $V_{CONTROL}$ to be between 0 and +3V, the output of the circuit at $V_{OUT}$ can be configured to vary between 0 and –3V, thereby achieving a range of different output voltages at $V_{OUT}$, as shown in FIG. 2.

The pair of inductors $L_1$ and $L_2$ are preferably of high enough impedance to block any AC voltage from reaching the dc-feed $V_{CONTROL}$.

In addition to producing a stable DC voltage at the output $V_{OUT}$, the disclosed circuit generates an AC ripple voltage. Such AC ripple voltages are unwanted, as they introduce spurious frequencies into any subsequent stage to which the output voltage $V_{OUT}$ is applied.

Since, as explained above, the two capacitors $C_1$, and $C_2$ charge at a 180° phase difference, even harmonics are reinforced. This ripple can be eliminated easily by filtering with low pass filters at a next stage.

Figure 3:
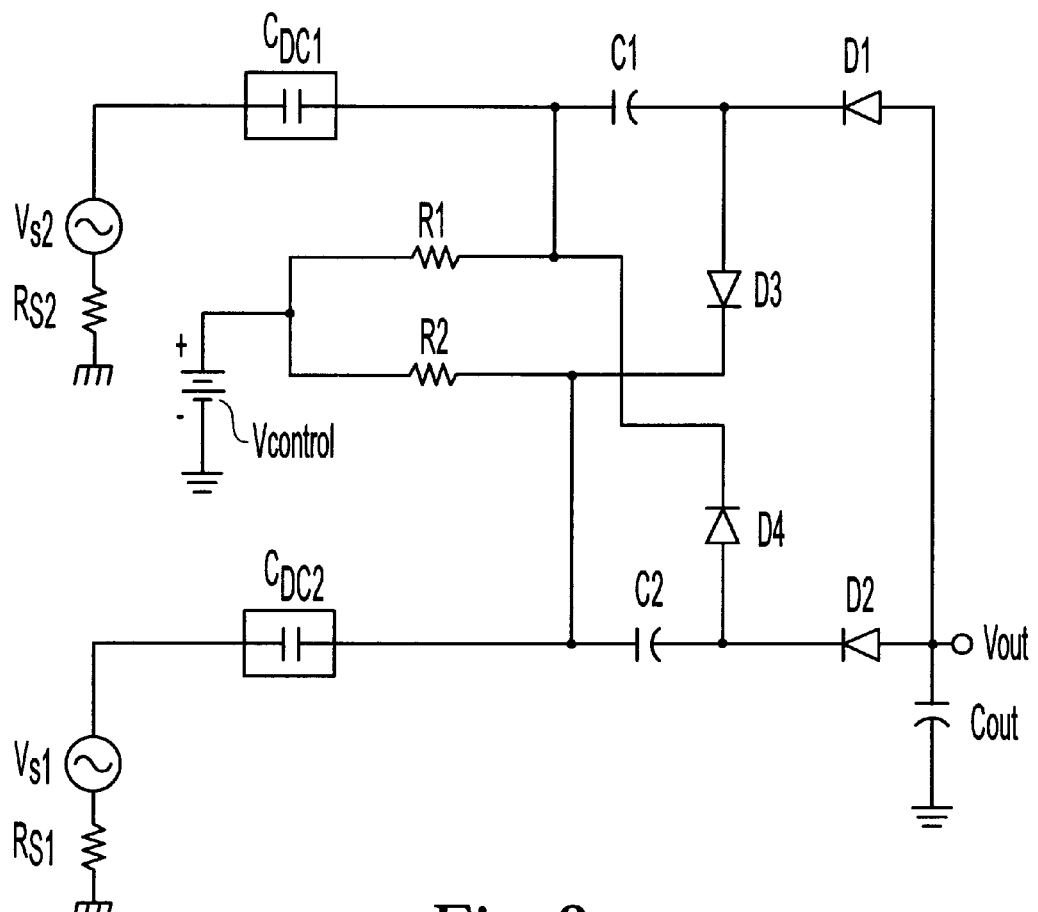
FIG. 3 is a schematic of another preferred embodiment of a dc-dc converter circuit of the present invention.

FIG. 3 shows a second preferred embodiment of a dc-dc converter circuit in accordance with the present invention. In the second embodiment, the inductors L1 and L2 are replaced by a pair of resistors R1 and R2, each of which is preferably about 1 KΩ. The operation of the second embodiment is substantially identical to that of the first embodiment. Since resistors can be fabricated on smaller spaces compared with inductors, the chip space required by the second embodiment is less than that of the first embodiment.

In addition, instead of one voltage source Vs as in the first embodiment, in the second embodiment a pair of voltage sources $Vs_1$ and $Vs_2$ that are 180 degrees out of phase with each other is shown. When a pair of voltage sources is used, each voltage source is preferably connected to an input resistor, $Rs_1$ and $Rs_2$. $Rs_1$ and $Rs_2$ are preferably each about 50 Ω.

It is further understood that the embodiments described herein are merely illustrative and not intended to limit the scope of the invention. One skilled in the art may make various changes, rearrangements and modifications without substantially departing from the principles of the invention, which is limited only in accordance with the claims. It should be easily understood that by changing the input voltage supplied by the voltage source $V_S$ and the control voltage source $V_{CONTROL}$, an entirely different range of output voltages can be achieved. Further, certain portions of the described circuitry can be modified to include discrete components, whereas the remaining portion can be etched into a monolithic integrated circuit. Additionally, the materials described herein may change. Accordingly, all such deviations and departures should be interpreted to be within the spirit and scope of the following claims.

What is claimed is:

1. A power supply circuit comprising:

a voltage source for applying a first alternating voltage at a first source terminal and a second alternating voltage at a second source terminal;

first capacitor means having a first and second terminal;

second capacitor means having a first and second terminal;

first diode means having an anode and a cathode; and second diode means having an anode and a cathode, third diode means having an anode and a cathode; and fourth diode means having an anode and a cathode, wherein, the first terminal of the first capacitor means is coupled to the first terminal of the voltage source, and the second terminal of the first capacitor means is coupled to the cathode of the first diode means and the anode of the second diode means, the first terminal of the second capacitor means is coupled to the second terminal of the voltage source, and the second terminal of the second capacitor means is coupled to the cathode of the third diode means and the anode of the fourth diode means, the anode of the first diode means is coupled to the anode of the third diode means to provide an output terminal, and the cathode of the second diode means is coupled to the first terminal of the second capacitor means, and the cathode of the fourth diode means is coupled to the first terminal of the first capacitor means.

2. The circuit of claim 1 wherein the voltage source operates substantially within a frequency range of 1–2 gigahertz.

3. The circuit of claim 1 wherein, during a first half cycle, the voltage source applies a first voltage at the first source terminal and a second voltage at the second source terminal, and, during a second half cycle, the voltage source applies the second voltage at the first source terminal and the first voltage at the second source terminal.

4. The circuit of claim 1 wherein each of the first capacitor means and the second capacitor means has a capacitance that is substantially equal to 1 pF.

5. The circuit of claim 1 wherein the circuit is a monolithic integrated circuit.

6. The circuit of claim 1 wherein the circuit is used in a telecommunications device.

7. The circuit of claim 1 wherein the circuit is used in a Radio Frequency receiver.

8. The circuit of claim 1 wherein the circuit is used as a bias source in a semiconductor device.

9. The circuit of claim 1 wherein the voltage source comprises: a first voltage source coupled between the first voltage source terminal and a reference node, and a second voltage source coupled between the second voltage source terminal and the reference node.

10. The circuit of claim 9 further comprising a first source resistance coupled between the first voltage source and the reference node and a second source resistance coupled between the second voltage source and the reference node.

11. The circuit of claim 1 further comprising:
a DC voltage source configured to generate a constant DC voltage, wherein the DC voltage source is coupled to the first terminal of the first capacitor means and the first terminal of the second capacitor means.

12. The circuit of claim 11 wherein the constant DC voltage is an adjustable DC voltage having a range substantially between 0 V and a voltage greater than 0 V.

13. The circuit of claim 11 further comprising:
first and second inductor means, wherein the first inductor means is coupled between the DC voltage source and the first terminal of the first capacitor means and the second inductor means is coupled between the DC voltage source and the first terminal of the second capacitor means.

14. The circuit of claim 13 wherein the first and second inductor means each has an inductance substantially equal to 10–20 nH.

15. The circuit of claim 13 further comprising:
first and second DC blocking capacitors,
wherein the first DC blocking capacitor is coupled between the first terminal of the voltage source and the first terminal of the first capacitor means, and
the second DC blocking capacitor is coupled between the second terminal of the voltage source and the first terminal of the second capacitor means.

16. The circuit of claim 11 further comprising: first and second resistor means, wherein the first resistor means is coupled between the DC voltage source and first terminal of the first capacitor means and the second resistor means is coupled between the DC voltage source and the first terminal of the second capacitor means.

17. The circuit of claim 16 wherein the first and second resistor means each has a resistance substantially equal to 1 KΩ.

18. The circuit of claim 11 further comprising
first and second DC blocking capacitors,
wherein the first DC blocking capacitor is coupled between the first terminal of the voltage source and the first terminal of the first capacitor means, and
the second DC blocking capacitor is coupled between the second terminal of the voltage source and the first terminal of the second capacitor means.

19. The circuit of claim 1 wherein the voltage source comprises a single voltage source coupled between the first voltage source terminal and the second voltage source terminal.

20. A power supply circuit comprising:
a voltage source for applying a first alternating voltage at a first source terminal and a second alternating voltage at a second source terminal;
a rectifier circuit having an input coupled to the first source terminal and providing a rectified DC voltage to an output; and
a DC voltage source for providing a DC control voltage to the input of the rectifier circuit to control the level of the voltage signal at the output.

21. The circuit of claim 20 wherein the first rectifier circuit comprises:
a capacitor having a first and second terminal, and
first and second diodes, each having an anode and a cathode;
wherein the first terminal of the capacitor provide the input and is coupled to the first source terminal, the second terminal of the capacitor is coupled to the cathode of the first diode and the anode of the second diode, the anode of the first diode is coupled to the output, and the cathode of the second diode is coupled to the second source terminal.

22. The circuit of claim 20 wherein the rectified DC voltage is provided to the output when the first alternating voltage is larger than the second alternating voltage, and the DC control voltage, when greater than zero, serves to raise the level of the voltage signal at the output with respect to a reference voltage level.

23. The circuit of claim 22 wherein the level of the voltage signal at the output is negative with respect to the reference voltage level.

24. The circuit of claim 20 wherein the input of the rectifier circuit is coupled to the first source terminal through a DC blocking means, and the input of the rectifier circuit is coupled to the DC control voltage source through an AC blocking means.

25. A power supply circuit comprising:
a first rectifier circuit for receiving a first alternating voltage and providing a first rectified DC voltage to an output during a half cycle of the first alternating voltage;
a second rectifier circuit for receiving a second alternating voltage and providing a second rectified DC voltage to the output during a half cycle of the second alternating voltage, wherein the first and second alternating voltages are of the same frequency and 180° out of phase, so that a voltage signal at the output substantially contains only even harmonic components of said frequency; and
a DC voltage source for providing a DC control voltage to the first and second rectifier circuits to control the level of the voltage signal at the output.

26. The circuit of claim 25 wherein: the first rectified DC voltage is provided to the output during a positive half cycle of the first alternating voltage; the second rectified DC voltage is provided to the output during a positive half cycle of the second alternating voltage; and the DC control voltage, when greater than zero, serves to raise the level of the voltage signal at the output with respect to a reference voltage level.

27. The circuit of claim 26 wherein the level of the voltage signal at the output is negative with respect to the reference voltage level.

28. The circuit of claim 25 further comprising a voltage source for providing an alternating voltage source signal, the alternating voltage source signal being the difference between the first alternating voltage and the second alternating voltage.

29. The circuit of claim 25 further comprising a first alternating voltage source coupled between an input of the first rectifier circuit and a reference node and a second alternating voltage source coupled between an input of the second rectifier circuit and the reference node.

30. The circuit of claim 25 wherein
the first rectifier circuit receives the first alternating voltage through a first DC blocking means and the second rectifier circuit receives the second alternating voltage through a second DC blocking means; and
the first rectifier circuit receives the DC control voltage through a first AC blocking means and the second rectifier circuit receives the DC control voltage through a second AC blocking means.

31. A rectifier circuit comprising:
a first capacitor and a second capacitor, each having a first terminal and a second terminal;
first, second, third, and fourth diodes, each having an anode and a cathode; and
an output capacitor having a first end and a second end;
wherein the first end of the output capacitor is coupled to a reference and the second end of the output capacitor is coupled to the anodes of the first and second diodes forming an output tapping point; the cathode of the first diode and the anode of the third diode are coupled to the second terminal of the first capacitor; the cathode of the third diode is coupled to the first terminal of the second capacitor; the cathode of the second diode and the anode of the fourth diode are coupled to the second terminal of the second capacitor; the cathode of the fourth diode is coupled to the first terminal of the first capacitor, whereupon an alternating voltage supplied between the first terminal of the first capacitor and the first terminal of the second capacitor is rectified, thereby resulting in a stable dc voltage at the output tapping point.

* * * * *

UNITED STATES PATENT AND TRADEMARK OFFICE
CERTIFICATE OF CORRECTION

PATENT NO. : 6,314,008 B1  Page 1 of 1
DATED : November 6, 2001
INVENTOR(S) : Bao et al.

It is certified that error appears in the above-identified patent and that said Letters Patent is hereby corrected as shown below:

<u>Title page,</u>
The following are added: -- [73] Assignee: Anadigics, Inc., Warren, NJ (US) --
-- [74] *Attorney, Agent, or Firm*—Pennie & Edmonds LLP --.

Signed and Sealed this

Twenty-eighth Day of May, 2002

*Attest:*

JAMES E. ROGAN
*Attesting Officer*  *Director of the United States Patent and Trademark Office*